United States Patent
Lin et al.

(10) Patent No.: US 10,727,750 B1
(45) Date of Patent: Jul. 28, 2020

(54) SYSTEM AND METHOD FOR IMPROVING CONTINUOUS LOAD TRANSITION OF DC-DC CONVERTER

(71) Applicant: ANPEC ELECTRONICS CORPORATION, Hsinchu (TW)

(72) Inventors: Hsin-Tai Lin, Taichung (TW); Tzu-Yang Yen, Taipei (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 0 days.

(21) Appl. No.: 16/589,737

(22) Filed: Oct. 1, 2019

(30) Foreign Application Priority Data

Jun. 28, 2019 (TW) .............................. 108122732 A

(51) Int. Cl.
*H02M 3/158* (2006.01)
*H02M 3/156* (2006.01)

(52) U.S. Cl.
CPC .. *H02M 3/1584* (2013.01); *H02M 2003/1566* (2013.01)

(58) Field of Classification Search
CPC .............. H02M 3/158; H02M 3/1584; H02M 2003/1566
See application file for complete search history.

(56) References Cited

U.S. PATENT DOCUMENTS

| 2017/0373595 | A1* | 12/2017 | Huang | H02M 3/158 |
| 2018/0013348 | A1* | 1/2018 | Paul | H02M 3/1584 |
| 2018/0294726 | A1* | 10/2018 | Priego | H02M 3/1584 |
| 2019/0302818 | A1* | 10/2019 | Liu | H02M 3/156 |

FOREIGN PATENT DOCUMENTS

TW            201909536 A     3/2019

* cited by examiner

*Primary Examiner* — Fred E Finch, III
(74) *Attorney, Agent, or Firm* — Li & Cai Intellectual Property (USA) Office

(57) ABSTRACT

A system and a method for improving continuous load transition of a DC-DC converter are provided. The system includes a conduction detector circuit, a counter circuit, a depth control circuit and a slope generator. The conduction detector circuit detects a phase signal of the DC-DC converter to generate a pulse signal. The counter circuit counts the number of pulse waves of the pulse signal to output a counting signal. The depth control circuit generates a pulled-down depth signal. The slope generator generates a slope signal according to the pulled-down depth signal. The pulled-down depth signal is pulled down by a first depth each time the switch circuit is conducted, but when the number of times that the switching circuit is conducted reaches a conduction number threshold, the pulled-down depth signal is pulled down by a second depth that is larger than the first depth.

12 Claims, 7 Drawing Sheets

SYSTEM AND METHOD FOR IMPROVING CONTINUOUS LOAD TRANSITION OF DC-DC CONVERTER

CROSS-REFERENCE TO RELATED PATENT APPLICATION

This application claims the benefit of priority to Taiwan Patent Application No. 108122732, filed on Jun. 28, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a DC-DC converter, and more particularly to a system and a method for improving continuous load transition of a DC-DC converter

BACKGROUND OF THE DISCLOSURE

An electronic device generally includes various components requiring different operating voltages. Therefore, a DC-DC voltage converter is essential for voltage adjustment and stabilization of the electronic device. Based upon different power requirements, various types of DC-DC voltage converters such as a buck converter and a boost converter have been developed. The buck converter can decrease an input DC voltage to a default voltage, and the boost converter can increase an input DC voltage. With advances in circuit technologies, both the buck and boost converters have been adjusted for different system architectures and requirements.

SUMMARY OF THE DISCLOSURE

In response to the above-referenced technical inadequacies, the present disclosure provides a system for improving continuous load transition of a DC-DC converter. The DC-DC converter includes an error amplifier, a comparator, a phase circuit and a switch circuit. The error amplifier outputs an error amplified signal according to a reference voltage and an output voltage of an output voltage node connected to the switch circuit. The comparator generates a comparing signal according to the error amplified signal and a slope signal. The phase circuit outputs a phase signal for controlling the switch circuit to generate the output voltage at the output voltage node according to the comparing signal. The system includes a conduction detector circuit, a counter circuit, a depth control circuit, and a slope generator. The conduction detector circuit is configured to detect the phase signal to generate a pulse signal. The counter circuit is connected to the conduction detector circuit and configured to count the number of pulse waves of the pulse signal to output a counting signal. The depth control circuit is connected to the counter circuit and the comparator and configured to generate a pulled-down depth signal according to the counting signal and the comparing signal. The slope generator is connected to the depth control circuit and configured to generate the slope signal according to the pulled-down depth signal. A waveform of the pulled-down depth signal is pulled down by a first depth each time the switch circuit is conducted. However, when the number of times that the switch circuit is conducted reaches a conduction number threshold, the waveform of the pulled-down depth signal is pulled down by a second depth that is larger than the first depth.

In certain embodiments, the first depth falls within a first depth threshold range, the second depth falls within a second depth threshold range, and depths within the first depth threshold range is larger than depths within the second depth threshold range.

In certain embodiments, the depth control circuit pulls down the pulled-down depth signal by the second depth once, or pulls down the pulled-down depth signal multiple times such that the pulled-down depth signal is pulled down by the second depth.

In certain embodiments, the switch circuit includes a sub-switch circuit. When the conduction detector circuit detects that the comparing signal is higher than the phase signal, the number of times that the sub-switch circuit is conducted is counted.

In certain embodiments, the switch circuit includes a plurality of sub-switch circuits. When the number of times that all the sub-switch circuits are conducted reaches the conduction number threshold, the waveform of the pulled-down depth signal is pulled down by the second depth.

In certain embodiments, the depth of the second depth is 1.5 times that of the first depth.

In addition, the present disclosure provides a method for improving continuous load transition of a DC-DC converter. The DC-DC converter includes an error amplifier, a comparator, a phase circuit and a switch circuit. The error amplifier outputs an error amplified signal according to a reference voltage and an output voltage of an output voltage node connected to the switch circuit. The comparator generates a comparing signal according to the error amplified signal and a slope signal. The phase circuit outputs a phase signal for controlling the switch circuit to generate the output voltage at the output voltage node according to the comparing signal. The method includes the following steps: detecting the phase signal to generate a pulse signal by a conduction detector circuit; counting the number of pulse waves of the pulse signal to output a counting signal by a counter circuit; generating a pulled-down depth signal according to the counting signal and the comparing signal by a depth control circuit; and generating the slope signal according to the pulled-down depth signal by a slope generator. A waveform of the pulled-down depth signal is pulled down by a first depth each time the switch circuit is conducted, but when the number of times that the switch circuit is conducted reaches a conduction number threshold, the waveform of the pulled-down depth signal is pulled down by a second depth that is larger than the first depth.

In certain embodiments, the first depth falls within a first depth threshold range, the second depth falls within a second depth threshold range, and depths within the first depth threshold range are larger than depths within the second depth threshold range.

In certain embodiments, the method further includes the following step: using the depth control circuit to pull down the pulled-down depth signal by the second depth once, or pulling down the pulled-down depth signal multiple times such that the pulled-down depth signal is pulled down by the second depth.

In certain embodiments, the method further includes the following step: counting the number of times that a sub-switch circuit included in the switch circuit is conducted when the conduction detector circuit detects that the comparing signal is higher than the phase signal.

In certain embodiments, the method further includes the following step: pulling down the waveform of the pulled-down depth signal by the second depth when the number of times that all sub-switch circuits included in the switch circuit are conducted reaches the conduction number threshold.

In certain embodiments, the depth of the second depth is 1.5 times that of the first depth.

As described above, the present disclosure provides the system and the method for improving continuous load transition of the DC-DC converter, which may pull down the slope signal of the slope generator by different depths, according to the number of times that the upper bridge switches of the switch circuit are conducted. It is worth noting that the slope signal is pulled down by a larger depth when the number of times that the upper bridge switches of the switch circuit are conducted reaches the conduction number threshold. Therefore, the present disclosure has a beneficial effect of preventing the output voltage and the output current of the DC-DC converter from overshooting or undershooting during the continuous transition of the load to which the multiphase circuit is applied.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
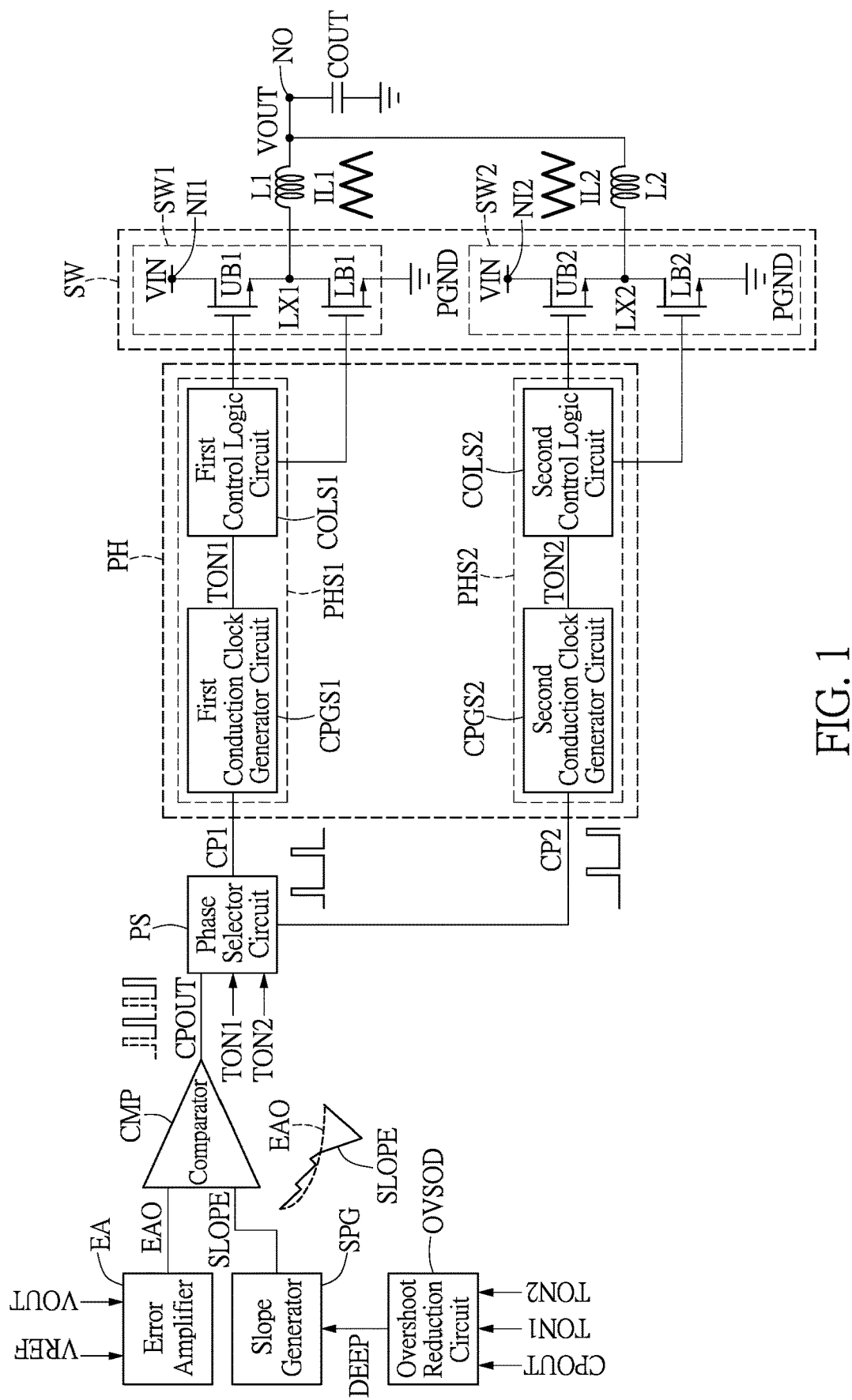
FIG. 1 is a circuit layout diagram of a system for improving continuous load transition of a DC-DC converter and the DC-DC converter according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
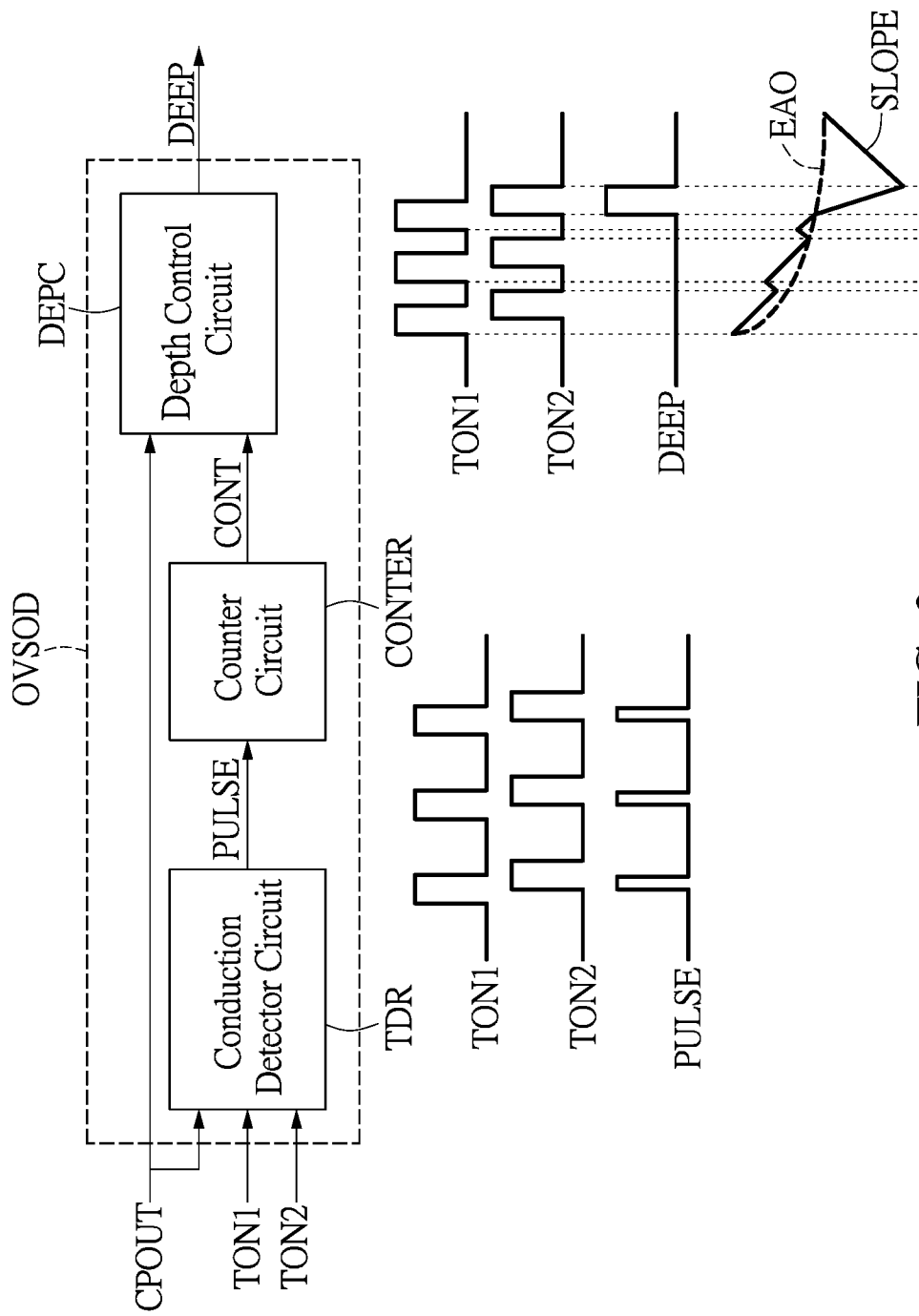
FIG. 2 is an internal circuit diagram of the system for improving continuous load transition of the DC-DC converter according to the embodiment of the present disclosure.
Figure 3:
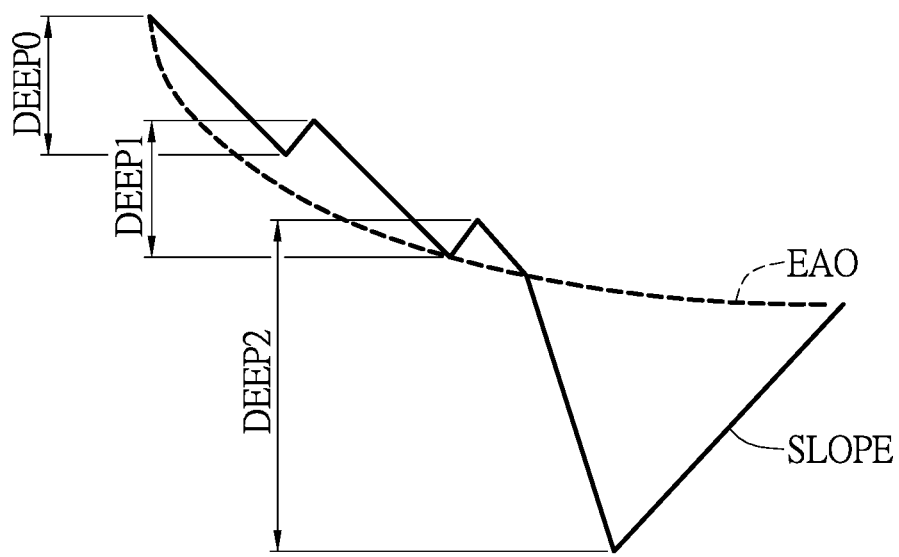
FIG. 3 is a waveform diagram of a slope signal generated by a slope generator and an error amplified signal generated by an error amplifier according to the embodiment of the present disclosure.

Reference is made to FIGS. 1 to 3, wherein FIG. 1 is a circuit layout diagram of a system for improving continuous load transition of a DC-DC converter and the DC-DC converter according to an embodiment of the present disclosure, FIG. 2 is an internal circuit diagram of the system for improving continuous load transition of the DC-DC converter according to the embodiment of the present disclosure, and FIG. 3 is a waveform diagram of a slope signal generated by a slope generator and an error amplified signal generated by an error amplifier according to the embodiment of the present disclosure.

As shown in FIG. 1, the DC-DC converter includes an error amplifier EA, a comparator CMP, a phase circuit PH and a switch circuit SW. The comparator CMP is connected to the error amplifier EA, a slope generator SPG and the phase circuit PH. The phase circuit PH is connected to the switch circuit SW.

One input terminal of the error amplifier EA is connected to a reference voltage source and receives a reference voltage VREF from the reference voltage source. Another input terminal of the error amplifier EA is connected to an output voltage node NO of the DC-DC converter and receives an output voltage VOUT of the DC-DC converter at the output voltage node NO. The error amplifier EA amplifies a difference between the output voltage VOUT of the DC-DC converter and the reference voltage VREF to output an error amplified signal EAO.

Two input terminals of the comparator CMP respectively receive the error amplified signal EAO from the error amplifier EA and a slope signal SLOPE from the slope generator SPG. The comparator CMP compares the error amplified signal EAO and the slope signal SLOPE to output a comparing signal CPOUT.

In practice, the phase circuit PH may include only one sub-phase circuit such as a first sub-phase circuit PHS1 shown in FIG. 1. The first sub-phase circuit PHS1 controls a first sub-switch circuit SW1 to control the output voltage VOUT of the DC-DC converter at the output voltage node NO, according to the comparing signal CPOUT from the comparator CMP.

In the embodiment, the phase circuit PH includes a plurality of sub-phase circuits such as the first sub-phase circuit PHS1 and a second sub-phase circuit PHS2. The first sub-phase circuit PHS1 and the second sub-phase circuit PHS2 may be turned on at the same time such that the output voltage VOUT more rapidly increases to be equal to a target voltage, thereby improving an effectiveness of continuous transition of a load.

When the phase circuit PH includes the plurality of sub-phase circuits such as the first sub-phase circuit PHS1 and the second sub-phase circuit PHS2, a phase selector circuit PS may be disposed between the comparator CMP and the phase circuit PH. An input terminal of the phase selector circuit PS is connected to an output terminal of the comparator CMP. Two output terminals of the phase selector circuit PS are connected respectively to the first sub-phase circuit PHS1 and the second sub-phase circuit PHS2. The phase selector circuit PS is configured to receive the comparing signal CPOUT from the comparator CMP and separate the comparing signal CPOUT.

For example, the phase selector circuit PS may output a plurality of pulse waves of the comparing signal CPOUT alternately to the first sub-phase circuit PHS1 and the second sub-phase circuit PHS2. In detail, a first pulse wave of the comparing signal CPOUT as shown by a dotted line in FIG. 1 is outputted to the first sub-phase circuit PHS1. A second pulse wave of the comparing signal CPOUT as shown by a solid line in FIG. 1 is outputted to the second sub-phase circuit PHS2. A third pulse wave of the comparing signal CPOUT as shown by a dotted line in FIG. 1 is outputted to the first sub-phase circuit PHS1. A fourth pulse wave of the comparing signal CPOUT as shown by a solid line in FIG. 1 is outputted to the second sub-phase circuit PHS2. If the comparing signal CPOUT has more pulse waves, the other pulse waves are also outputted in the above-mentioned manner. As a result, the first sub-phase circuit PHS1 receives a first sub-comparing signal CP1 separated from the comparing signal CPOUT. The first sub-comparing signal CP1 includes the first pulse wave and third pulse wave. The second sub-phase circuit PHS2 receives a second sub-comparing signal CP2 separated from the comparing signal CPOUT. The second sub-comparing signal CP2 includes the second pulse wave and fourth pulse wave.

If the phase circuit PH includes the plurality of sub-phase circuits, but only one of which is turned on, for example, only the first sub-phase circuit PHS1 is turned on, and the second sub-phase circuit PHS2 is turned off, the phase selector circuit PS does not separate the comparing signal CPOUT. Under this condition, the first sub-phase circuit PHS1 receives the comparing signal CPOUT from the comparator CMP.

The first sub-phase circuit PHS1 and the second sub-phase circuit PHS2 respectively control a plurality of sub-switch circuits included in the switch circuit SW. For example, the first sub-phase circuit PHS1 controls the first sub-switch circuit SW1 according to the first sub-comparing signal CP1 from the phase selector circuit PS. The second sub-phase circuit PHS2 controls the second sub-switch circuit SW2 according to the second sub-comparing signal CP2 from the phase selector circuit PS.

The first sub-phase circuit PHS1 may include a first conduction clock generator circuit CPGS1 and a first control logic circuit COLS1. The first conduction clock generator circuit CPGS1 is connected between the phase selector circuit PS and the first control logic circuit COLS1, and outputs a first phase signal TON1 according to the first sub-comparing signal CP1. For example, the first conduction clock generator circuit CPGS1 may calculate a ratio of an input voltage VIN of the first sub-switch circuit SW1 and the output voltage VOUT of the output voltage node NO to determine a duty cycle of the first phase signal TON1. The first control logic circuit COLS1 controls the first sub-switch circuit SW1 according to the first phase signal TON1.

Similarly, the second sub-comparing signal CP2 may include a second conduction clock generator circuit CPGS2 and a second control logic circuit COLS2. The second conduction clock generator circuit CPGS2 is connected between the phase selector circuit PS and the second control logic circuit COLS2, and outputs a second phase signal TON2 according to the second sub-comparing signal CP2. For example, the second conduction clock generator circuit CPGS2 may calculate a ratio of the input voltage VIN of the second sub-switch circuit SW2 and the output voltage VOUT of the output voltage node NO to determine a duty cycle of the second phase signal TON2. The second control logic circuit COLS2 controls the second sub-switch circuit SW2 according to the second phase signal TON2.

When the first control logic circuit COLS1 receives the first phase signal TON1 at a high level, the first control logic circuit COLS1 turns on an upper bridge switch UB1 of the first sub-switch circuit SW1 and turns off a lower bridge switch LB1 of the first sub-switch circuit SW1. On the other hand, when the second conduction clock generator circuit CPGS2 receives the second phase signal TON2 at a high level, the second control logic circuit COLS2 turns on an upper bridge switch UB2 of the second sub-switch circuit SW2 and turns off a lower bridge switch LB2 of the second sub-switch circuit SW2.

One terminal of a first inductor L1 is connected to a node LX1 between the upper bridge switch UB1 and the lower bridge switch LB1. Another terminal of the first inductor L1 is connected to the output voltage node NO. One terminal of a second inductor L2 is connected to a node LX2 between the upper bridge switch UB2 and the lower bridge switch LB2. Another terminal of the second inductor L2 is connected to the output voltage node NO. In the embodiment, the upper bridge switch UB1 and the lower bridge switch LB2 are turned on at the same time such that a first inductor current IL1 flowing through the first inductor L1 and a second inductor current IL2 flowing through the second inductor L2 rapidly increase. As a result, the output voltage VOUT of the DC-DC converter rapidly increases. For example, each of the first inductor current IL and the second inductor current IL2 has a plurality of sawtooth waves.

It is worth noting that, in order to meet a wide range of applications and conditions, a responding speed of a loop is usually designed to be slow. Therefore, the common DC-DC converter uses a plurality of phase circuits such as two phase circuits to control switch circuits, such that an output voltage of an output voltage node of the common DC-DC converter rapidly increases. As a result, during continuous load transition of a load, an excessive inductor current may flow through an inductor between the switch circuits and the output voltage node such that the output voltage and an output current of the common DC-DC converter overshoot.

Therefore, in the embodiment, the system for improving continuous load transition of the DC-DC converter includes an overshoot reduction circuit OVSOD applied to the above-mentioned DC-DC converter. The overshoot reduction circuit OVSOD may include the slope generator SPG. Alternatively, the DC-DC converter includes the slope generator SPG. An output terminal of the overshoot reduction circuit OVSOD is connected to an input terminal of the slope generator SPG.

An input terminal of the overshoot reduction circuit OVSOD is connected to the comparator CMP, the first conduction clock generator circuit CPGS1 of the first sub-phase circuit PHS1, and the second conduction clock generator circuit CPGS2 of the second sub-phase circuit PHS2. As shown in FIG. 1, the overshoot reduction circuit OVSOD outputs a pulled-down depth signal DEEP to the slope generator SPG according to the comparing signal CPOUT, the first phase signal TON1, and the second phase signal TON2.

As shown in FIG. 2, the overshoot reduction circuit OVSOD includes a conduction detector circuit TDR, a counter circuit CONTER and a depth control circuit DEPC. The conduction detector circuit TDR is connected to output terminals of the first and second conduction clock generator circuits CPGS1 and CPGS2 of the phase circuit PH. The counter circuit CONTER is connected to an output terminal of the conduction detector circuit TDR. The depth control circuit DEPC is connected to an output terminal of the counter circuit CONTER and the output terminal of the comparator CMP of the DC-DC converter.

The first control logic circuit COLS1 is configured to control the first sub-switch circuit SW1 according to the first phase signal TON1 from the first conduction clock generator circuit CPGS1. Therefore, the conduction detector circuit TDR detects the first phase signal TON1. On the other hand, the second control logic circuit COLS2 is configured to control the second sub-switch circuit SW2 according to the second phase signal TON2 from the second conduction clock generator circuit CPGS2. Therefore, the conduction detector circuit TDR detects the second phase signal TON2.

In practice, if only one sub-phase circuit such as the first sub-phase circuit PHS1 is applied or turned on to control a single sub-switch circuit such as the first sub-switch circuit SW1 to increase the output voltage VOUT of the output voltage node NO, the conduction detector circuit TDR obtains and detects levels of the comparing signal CPOUT and the first phase signal TON1 to count the number of times that the first sub-switch circuit SW1 is conducted. For example, the conduction detector circuit TDR counts the number of times that the comparing signal CPOUT is detected to be higher than the first phase signal TON1 to count the number of times that the first sub-switch circuit SW1 is conducted, and accordingly generates a pulse signal PULSE. The number of pulse waves of the pulse signal PULSE corresponds to the number of pulse waves of the first phase signal TON1. The counter circuit CONTER counts the number of pulse waves of the pulse signal PULSE that is equal to the number of times that the sub-switch circuit SW1 is conducted to generate a counting signal CONT.

In the embodiment, the plurality of sub-phase circuits such as the first sub-phase circuit PHS1 and the second sub-phase circuit PHS2 are configured to respectively control the plurality of sub-switch circuits such as the first sub-switch circuit SW1 and the second sub-switch circuit SW2. As a result, the output voltage VOUT of the output voltage node NO can rapidly increase. The conduction detector circuit TDR detects the number of times that the first phase signal TON1 and the second phase signal TON2 are conducted at the same time, and accordingly generates the pulse signal PULSE. The counter circuit CONTER counts the number of times that the first phase signal TON1 and the second phase signal TON2 are conducted at the same time. The number of pulse waves of the pulse signal PULSE generated by the conduction detector circuit TDR corresponds to the number of pulse waves of the first phase signal TON1 and the second phase signal TON2 that are conducted at the same time.

For example, whenever the first phase signal TON1 and the second phase signal TON2 respectively generate a pulse wave (at the same time), the conduction detector circuit TDR generates a pulse wave. For example, as shown in FIG. 2, the conduction detector circuit TDR generates three pulse waves. A rising edge of the pulse wave of the pulse signal PULSE corresponds to a rising edge of the pulse wave of the second phase signal TON2. The counter circuit CONTER counts the number of pulse waves such as the three pulse waves to generate the counting signal CONT. That is, the counter circuit CONTER counts the number of times that both the first sub-switch circuit SW1 and the second sub-switch circuit SW2 are conducted (at the same time), such as three times, and accordingly to generate the counting signal CONT.

The depth control circuit DEPC generates the pulled-down depth signal DEEP according to the comparing signal CPOUT from the comparator CMP and the counting signal CONT from the counter circuit CONTER. For example, the depth control circuit DEPC determines whether or not the sub-switch circuits such as the first sub-switch circuit SW1 and the second sub-switch circuit SW2 are conducted and the number of times that they are conducted. Whenever any one or both of the first sub-switch circuit SW1 and the second sub-switch circuit SW2 are conducted, a waveform of the slope signal SLOPE is pulled down by a depth. That is, a voltage of the waveform of the slope signal SLOPE reduces.

As shown in FIGS. 2 and 3, when the first phase signal TON1 or the second phase signal TON2 generates a first pulse wave, an upper bridge switch UP1 of the first sub-switch circuit SW1 or an upper bridge switch UP2 of the second sub-switch circuit SW2 is conducted. Under this condition, the waveform of the slope signal SLOPE is pulled down by an initial depth DEEP0. For example, the initial depth DEEP0 falls within an initial depth threshold range.

When the first phase signal TON1 or the second phase signal TON2 generates a second pulse wave, the upper bridge switch UP1 of the first sub-switch circuit SW1 or the upper bridge switch UP2 of the second sub-switch circuit SW2 is conducted again. Under this condition, the waveform of the slope signal SLOPE is pulled down by a first depth DEEP1. For example, the first depth DEEP1 falls within a first depth threshold range. The first depth DEEP1 may be equal to the initial depth DEEP0. The first depth threshold range may be equal to the initial depth threshold range.

It is worth noting that, if the upper bridge switch UP1 of the first sub-switch circuit SW1 and the upper bridge switch UP2 of the second sub-switch circuit SW2 are conducted too many times, the first inductor current IL1 the second inductor current IL2, or an output current that is a sum of the first inductor current IL1 and the second inductor current IL2 will be too large. As a result, an amplitude of the output voltage VOUT of the DC-DC converter at the output voltage node NO will be too high. Therefore, when the first sub-switch circuit SW1 and the second sub-switch circuit SW2 are conducted (at the same time) too many times, the waveform of the slope signal SLOPE is pulled down by a larger depth.

Specifically, when the number of the pulse waves of the first phase signal TON1 and the number of the pulse waves of the second phase signal TON2 both reach or are not smaller than a pulse number threshold such as two pulses, the number of times that the upper bridge switch UP1 of the first sub-switch circuit SW1 and the upper bridge switch UP2 of the second sub-switch circuit SW2 are conducted (at the same time) reaches or is not smaller than a conduction number threshold such as two times. Under this condition, the waveform of the slope signal SLOPE is pulled down by a second depth DEEP2. The second depth DEEP2 is larger than the first depth DEEP1.

It should be understood that, if the waveform of the slope signal SLOPE is pulled down by too small a depth, the conversion of the load may be unstable. If the waveform of the slope signal SLOPE is pulled down by too large a depth, the output voltage VOUT of the DC-DC converter may increase too slowly, resulting in a poor efficiency of the conversion of the load.

Therefore, in the embodiment, the second depth DEEP2 is limited to falling within a second depth threshold range. For example, the second depth DEEP2 is 1.5 times the first depth DEEP1, but the present disclosure is not limited thereto. In the embodiment, the waveform of the slope signal SLOPE is pulled down by the second depth DEEP2 once. In practice, the pulled-down depth signal may be pulled down multiple times such that it is pulled down by the second depth DEEP2.

After the waveform of the slope signal SLOPE is pulled down by the second depth DEEP2, a voltage of the error amplified signal EAO is higher than a voltage of the slope signal SLOPE. After waiting for a period of time, the voltage of the error amplified signal EAO increases to be equal to or lower than the voltage of the slope signal SLOPE. As a result, the first inductor current IL1 and the second inductor current IL2 increase more slowly, thereby preventing the output voltage VOUT of the DC-DC converter from overshooting.

It should be understood that a depth that the waveform of the slope signal SLOPE is pulled down may be adaptively adjusted, according to conditions of the DC-DC converter, integrated circuits applied thereto and a surrounding environment thereof, and so on. The initial depth DEEP0, the first depth DEEP1, and the second depth DEEP2 in the embodiment are only exemplified, and the present disclosure is not limited thereto.

Figure 4:
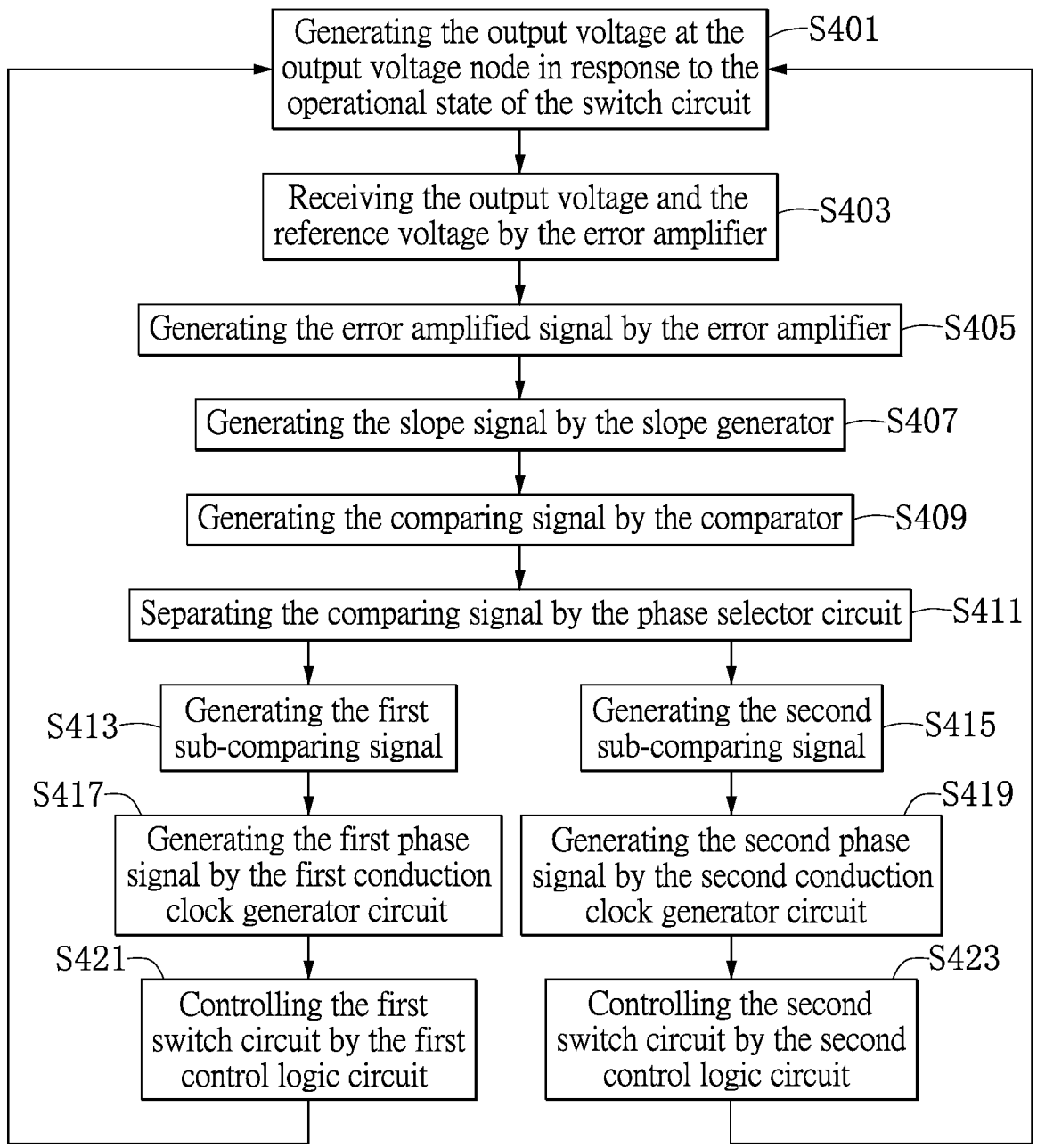
FIG. 4 is a flowchart diagram of a method for continuous load transition of the DC-DC converter according to the embodiment of the present disclosure.

Reference is made to FIG. 4, which is a flowchart diagram of a method for continuous load transition of the DC-DC converter according to the embodiment of the present disclosure. The method of continuous load transition of the DC-DC converter shown in FIG. 1 includes steps shown in FIG. 4, which are specifically described in the following.

In step S401, the DC-DC converter generates the output voltage VOUT at the output voltage node NO in response to operational states of the first sub-switch circuit SW1 and the second sub-switch circuit SW2.

In step S403, the error amplifier EA receives the output voltage VOUT of the DC-DC converter and receives the reference voltage VREF from the from the reference voltage source.

In step S405, the error amplifier EA amplifies the difference between the output voltage VOUT of the DC-DC converter and the reference voltage VREF to output the error amplified signal EAO.

In step S407, the slope generator SPG generates the slope signal SLOPE.

In step S409, the comparator CMP compares the error amplified signal EAO from the error amplifier signal EAO with the slope signal SLOPE from the slope generator SPG to generate the comparing signal CPOUT.

In step S411, the phase selector PS separates the comparing signal CPOUT.

The comparing signal CPOUT is separated into the first sub-comparing signal CP1 in step S413 and the second sub-comparing signal CP2 in step S415.

In step S417, the first conduction clock generator circuit CPGS1 generates the first phase signal TON1 according to the first sub-comparing signal CP1. In step S419, the second conduction clock generator circuit CPGS2 generates the second phase signal TON2 according to the second sub-comparing signal CP2.

In step S421, the first control logic circuit COLS1 controls the first sub-switch circuit SW1 according to the first phase signal TON1. In step S423, the second control logic circuit COLS2 controls the second sub-switch circuit SW2 according to the second phase signal TON2. The first control logic circuit COLS1 turns on the upper bridge switch UB1 of the first sub-switch circuit SW1, and the second control logic circuit COLS2 turns on the upper bridge switch UB2 of the second sub-switch circuit SW2, at the same time. Under this condition, the output voltage VOUT of the DC-DC converter can rapidly increase to realize continuous transition of a load of a system connected to the output voltage node NO.

Figure 5:
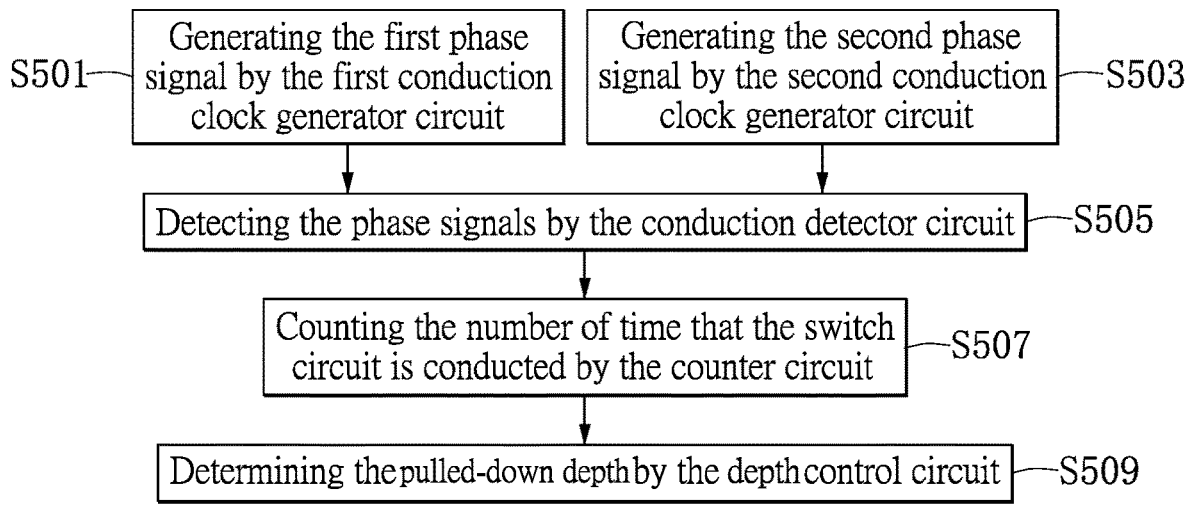
FIG. 5 is a flowchart diagram of a method for improving continuous load transition of the DC-DC converter according to the embodiment of the present disclosure.

Reference is made to FIG. 5, which is a flowchart diagram of a method for improving continuous load transition of the DC-DC converter according to the embodiment of the present disclosure. As shown in FIG. 5, the method for improving continuous load transition of the DC-DC converter in the embodiment includes the following steps.

In step S501, the first conduction clock generator circuit CPGS1 generates the first phase signal TON1 according to the first sub-comparing signal CP1. In step S503, the second conduction clock generator circuit CPGS2 generates the second phase signal TON2 according to the second sub-comparing signal CP2.

In step S505, the conduction detector circuit TDR detects the first phase signal TON1 and the second phase signal TON2 to generate the pulse signal PULSE.

In step S507, the counter circuit COUNTER counts the number of pulse waves of the pulse signal PULSE to count the number of times that the first sub-switch circuit SW1 and the second sub-switch circuit SW2 are conducted.

In step S509, the deep control circuit DEPC determines a deep that the slope signal SLOPE is pulled down to output a pulled-down depth signal DEEP according to the number of times that the first sub-switch circuit SW1 and the second sub-switch circuit SW2 are conducted.

Then, step S407 shown in FIG. 4 is performed. In step S407, the slope generator SPG generates the slope signal SLOPE according to the pulled-down depth signal DEEP. Step S409 to S423 are then performed. As a result, the output voltage VOUT generated by the DC-DC converter at the output voltage node NO varies in step S401 such that the waveform of the slope signal SLOPE is pulled down by a depth such as the second depth DEEP2 in Step S407. Therefore, the output voltage VOUT of the DC-DC converter increases more slowly, thereby preventing the output voltage VOUT from overshooting.

Figure 6:
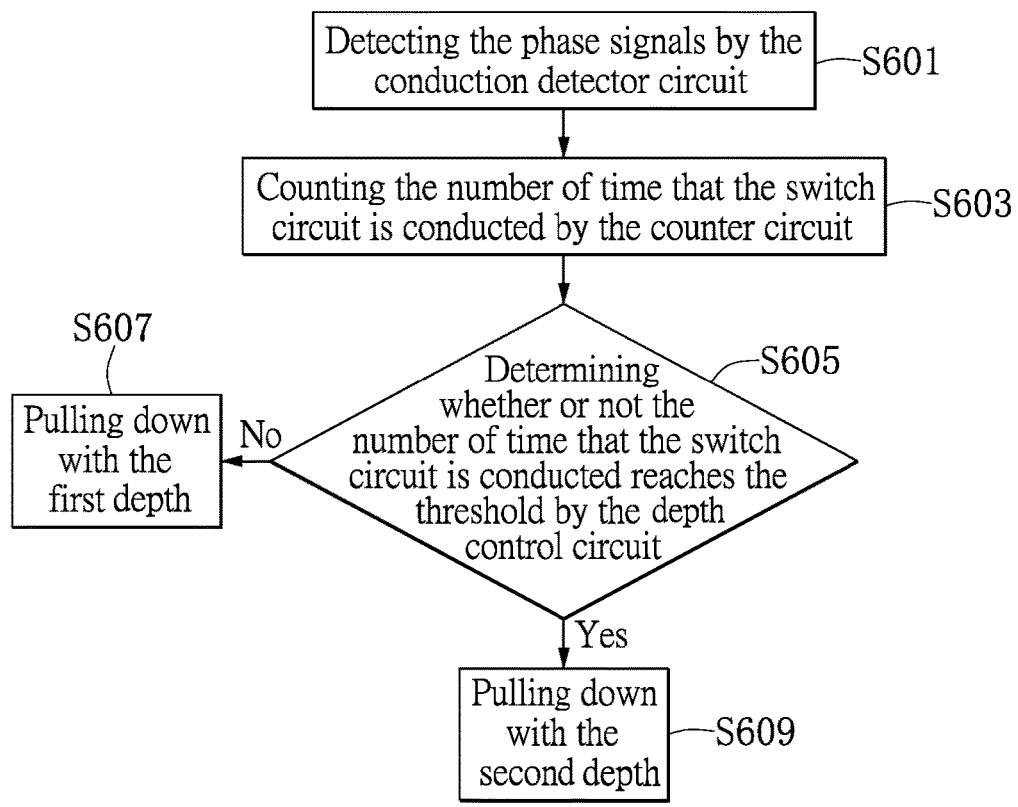
FIG. 6 is a flowchart diagram of counting the number of times that a switch circuit is conducted to determine a pulled-down depth in a method for improving continuous load transition of the DC-DC converter according to the embodiment of the present disclosure.

Reference is made to FIG. 6, which is a flowchart diagram of counting the number of times that a switch circuit is conducted to determine a pulled-down depth in a method for improving continuous load transition of the DC-DC converter according to the embodiment of the present disclosure. As shown in FIG. 6, the method for improving continuous load transition of the DC-DC converter in the embodiment includes the following steps.

In step S601, if the plurality of sub-phase circuits (in practice, it may be referred to as a multiphase circuit) are applied, the conduction detector circuit TDR detects that the first phase signal TON1 and the second phase signal TON2 to obtain the number of times that the upper bridge switch UP1 of the first sub-switch circuit SW1 and the upper bridge switch UP2 of the second sub-switch circuit SW2 are conducted (at the same time) to output the pulse signal PULSE.

If the only one sub-phase circuit such as the first sub-switch circuit PHS1 is applied (in practice, it may be referred to as a single phase circuit), the conduction detector circuit TDR detects the first phase signal TON1 and the second phase signal TON2 to generates the pulse signal PULSE. For example, a pulse is generated in the pulse signal PULSE each time the comparing signal CPOUT is detected to be higher than the first phase signal TON1.

In step S603, if the plurality of sub-phase circuits are applied, the counter circuit CONTER counts the number of pulse waves of the pulse signal PUSLE to obtain the number of times that the first sub-switch circuit SW1 and the second sub-switch circuit SW2 are conducted. If the single sub-phase circuit is applied, the counter circuit CONTER counts the number of pulse waves of the pulse signal PUSLE to obtain the number of times that a single sub-phase circuit such as the first sub-switch circuit SW1 is conducted.

In step S605, if the plurality of sub-phase circuits are applied, the deep control circuit DEPC determines whether or not the number of times that the first sub-switch circuit SW1 and the second sub-switch circuit SW2 are conducted (at the same time) reaches (i.e., is larger than or equal to) the conduction number threshold such as two times. If the single sub-phase circuit is applied, the deep control circuit DEPC determines whether or not the number of times that the single sub-phase circuit such as the first sub-phase circuit PHS1 is conducted reaches (i.e., is larger than or equal to) the conduction number threshold. If the number of times that the single sub-phase circuit is conducted does not reach (i.e., is not larger than or equal to) the conduction number threshold, step S607 is performed. In step S607, the waveform of the slope signal SLOPE is pulled down by the first depth DEEP1. If the number of times that the single sub-phase circuit is conducted reaches (i.e., is larger than or equal to) the conduction number threshold, step S609 is performed. In step S609, the waveform of the slope signal SLOPE is pulled down by the second depth DEEP2 that is larger than the first depth DEEP1.

Figure 7:
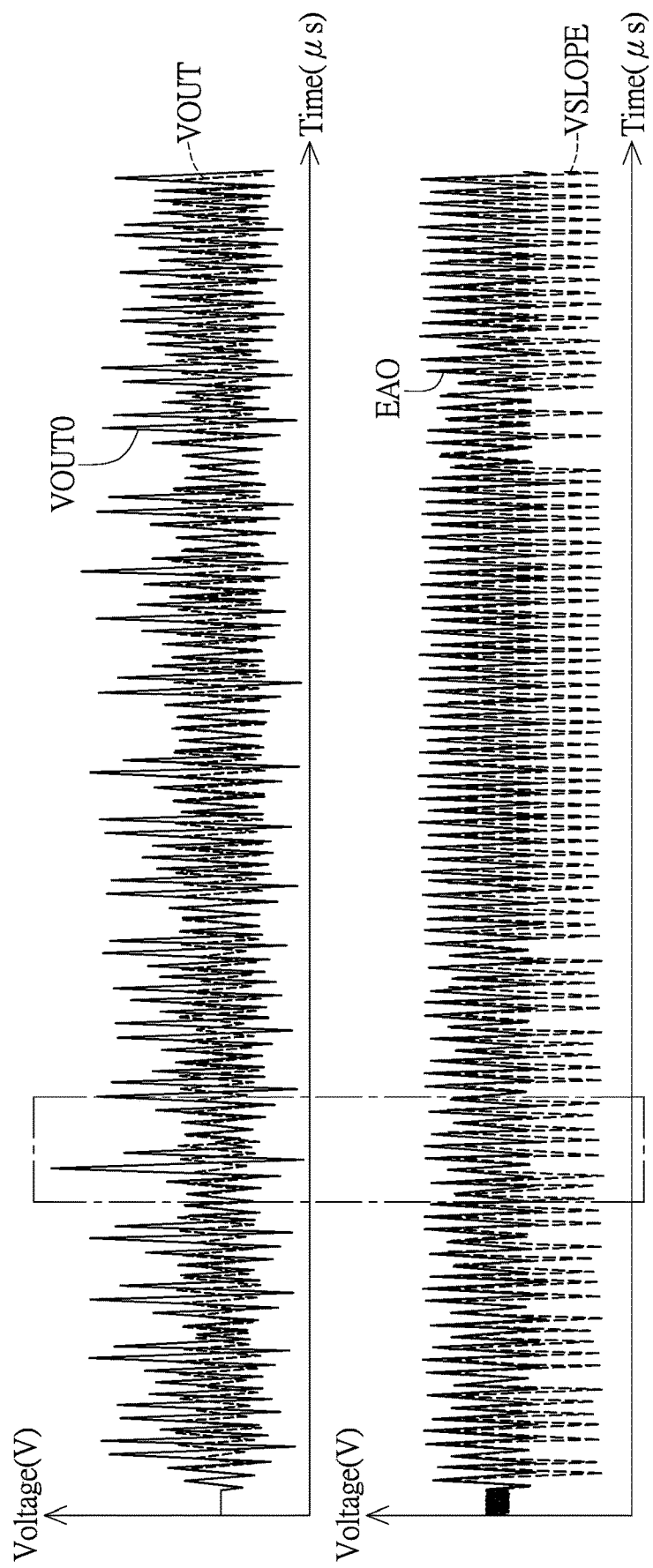
FIG. 7 is a waveform diagram of output voltage signals of a common DC-DC converter and the DC-DC converter of the embodiment of the present disclosure, an error amplified signal of the common DC-DC converter and a slope signal of the embodiment of the present disclosure.
Figure 8A:
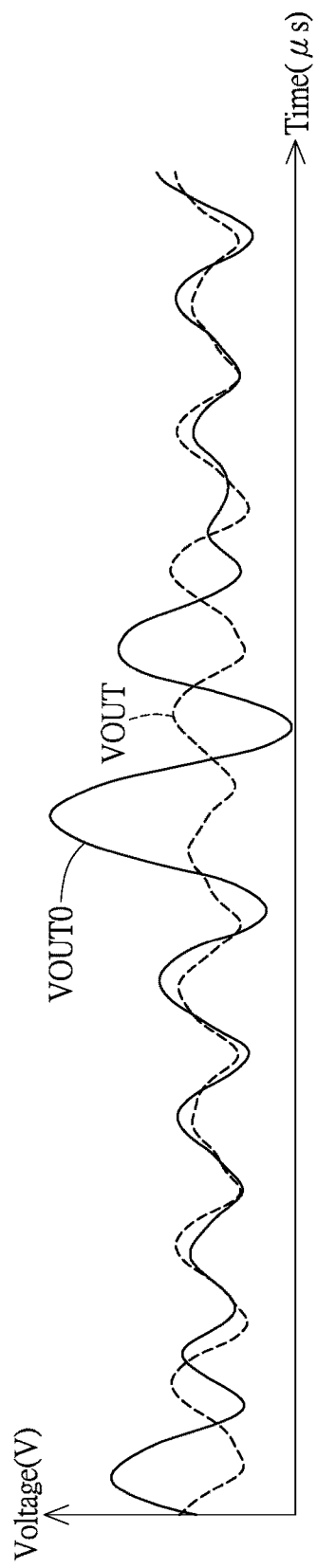
FIG. 8A is a waveform diagram of the output voltage signals of the common DC-DC converter and the DC-DC converter of the embodiment of the present disclosure.
Figure 8B:
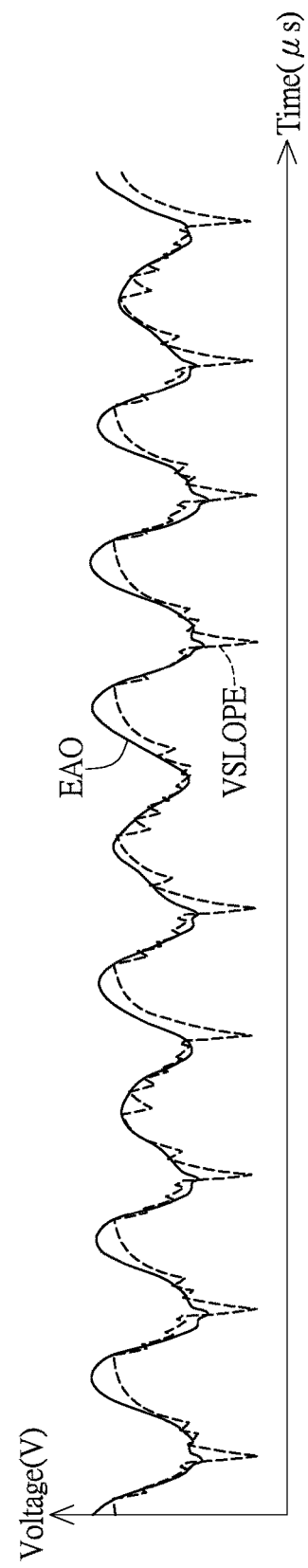
FIG. 8B is a waveform diagram of the error amplified signal of the common DC-DC converter and the slope signal of the embodiment of the present disclosure.
Figure 8C:
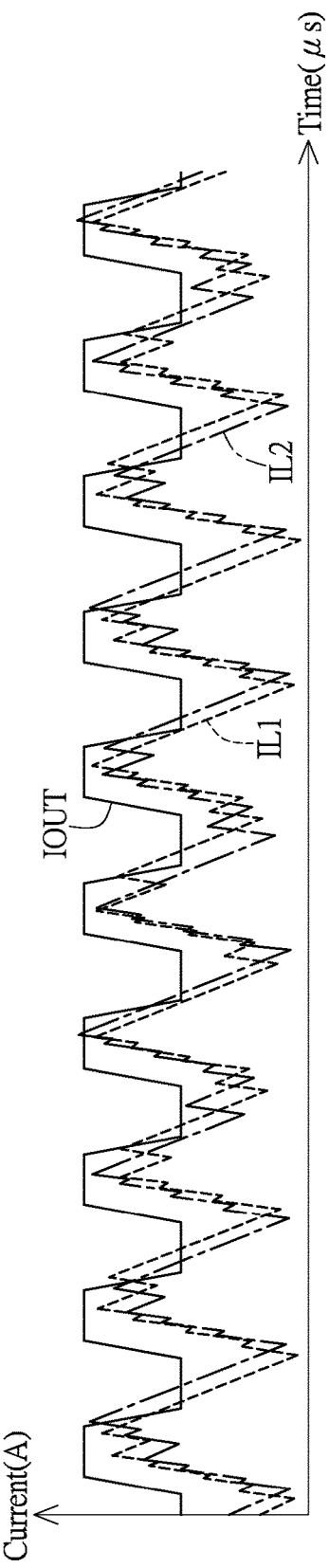
FIG. 8C is a waveform diagram of an output current signal and an inductor current signal of the embodiment of the present disclosure.

Reference is made to FIGS. 7, 8A, 8B and 8C, wherein FIG. 7 is a waveform diagram of output voltage signals of a common DC-DC converter and the DC-DC converter of the embodiment of the present disclosure, an error amplified signal of the common DC-DC converter and a slope signal of the embodiment of the present disclosure; FIG. 8A is a waveform diagram of the output voltage signals of the common DC-DC converter and the DC-DC converter of the embodiment of the present disclosure, FIG. 8B is a waveform diagram of the error amplified signal of the common DC-DC converter and the slope signal of the embodiment of the present disclosure, and FIG. 8C is a waveform diagram of an output current signal and an inductor current signal of the embodiment of the present disclosure.

As shown in FIGS. 7 and 8A, VOUT0 represents the output voltage signal of the common DC-DC converter, and VOUT represents the output voltage signal of the DC-DC converter that applies the system for improving continuous load transition of the DC-DC converter in the embodiment of the present disclosure. As shown in FIGS. 7 and 8B, EAO represents the error amplified signal of the common DC-DC converter, and VSLOPE represents the slope signal of slope generator of the system for improving continuous load transition of the DC-DC converter in the embodiment of the present disclosure. As shown in FIG. 8C, IOUT represents that the output current signal of the DC-DC converter that applies the system for improving continuous load transition of the DC-DC converter in the embodiment of the present disclosure, and IL1 and IL2 represent that the inductor current signals of the system for improving continuous load transition of the DC-DC converter in the embodiment of the present disclosure.

An amplitude of the output voltage signal VOUT0 of the common DC-DC converter reaches up to 672 mV. In contrast, an amplitude of the output voltage signal VOUT of the DC-DC converter in the embodiment of the present disclosure only reaches up to 246 mV. A difference between 672 mV and 246 mV is 428 mV.

A peak voltage of the error amplified signal EAO of the error amplifier of the common DC-DC converter overshoots to 2.227V, and a valley voltage of the error amplified signal EAO undershoots to 1.665V. In order to reduce the overshoot of the peak voltage and the undershoot of the valley voltage, the waveform of the slope signal VSLOPE generated by the slope generator is pulled downed by the second depth. As a result, current values of the inductor current signal IL1 of the first inductor and the inductor current signal IL2 of the second inductor are constant, and the voltages of the error amplified signal EAO does not overshoot and undershoot. Therefore, the peak voltage of the error amplified signal EAO is reduced to be equal to or lower than 1.911V from 2.227V, and a difference between them is 315 mV or less. The valley voltage of the error amplified signal EAO is reduced to be equal to or lower than 1.56V from 1.665V, and a difference between them is 105 mv or less.

In summary, the present disclosure provides the system and the method for improving continuous load transition of the DC-DC converter, which may pull down the slope signal of the slope generator by different depths, according the number of times that the upper bridge switches of the switch circuit are conducted. It is worth noting that the slope signal is pulled down by a larger depth when the number of times that the upper bridge switches of the switch circuit are conducted reaches the conduction number threshold. Therefore, the present disclosure has a beneficial effect of preventing the output voltage and the output current of the DC-DC converter from overshooting or undershooting during the continuous transition of the load to which the multiphase circuit is applied.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for improving continuous load transition of a DC-DC converter, the DC-DC converter including an error amplifier, a comparator, a phase circuit and a switch circuit, wherein the error amplifier outputs an error amplified signal according to a reference voltage and an output voltage of an output voltage node connected to the switch circuit, the comparator generates a comparing signal according to the error amplified signal and a slope signal, the phase circuit outputs a phase signal for controlling the switch circuit to generate the output voltage at the output voltage node according to the comparing signal, the system comprises:
   a conduction detector circuit configured to detect the phase signal to generate a pulse signal;
   a counter circuit connected to the conduction detector circuit and configured to count the number of pulse waves of the pulse signal to output a counting signal;
   a depth control circuit connected to the counter circuit and the comparator and configured to generate a pulled-down depth signal according to the counting signal and the comparing signal; and
   a slope generator connected to the depth control circuit and configured to generate the slope signal according to the pulled-down depth signal;
   wherein a waveform of the pulled-down depth signal is pulled down by a first depth each time the switch circuit is conducted, but when the number of times that the switch circuit is conducted reaches a conduction number threshold, the waveform of the pulled-down depth signal is pulled down by a second depth that is larger than the first depth.

2. The system of claim 1, wherein the first depth falls within a first depth threshold range, the second depth falls within a second depth threshold range, and depths within the first depth threshold range is larger than depths within the second depth threshold range.

3. The system of claim 1, the depth control circuit pulls down the pulled-down depth signal by the second depth once, or pulls down the pulled-down depth signal multiple times such that the pulled-down depth signal is pulled down by the second depth.

4. The system of claim 1, wherein the switch circuit includes a sub-switch circuit, and when the conduction detector circuit detects that the comparing signal is higher than the phase signal, the number of times that the sub-switch circuit is conducted is counted.

5. The system of claim 1, the switch circuit includes a plurality of sub-switch circuits, and when the number of times that all the sub-switch circuits are conducted reaches the conduction number threshold, the waveform of the pulled-down depth signal is pulled down by the second depth.

6. The system of claim 1, wherein the depth of the second depth is 1.5 times that of the first depth.

7. A method for improving continuous load transition of a DC-DC converter, the DC-DC converter including an error amplifier, a comparator, a phase circuit and a switch circuit, wherein the error amplifier outputs an error amplified signal according to a reference voltage and an output voltage of an output voltage node connected to the switch circuit, the comparator generates a comparing signal according to the error amplified signal and a slope signal, the phase circuit outputs a phase signal for controlling the switch circuit to generate the output voltage at the output voltage node according to the comparing signal, the method comprises the following steps:
   detecting the phase signal to generate a pulse signal by a conduction detector circuit;
   counting the number of pulse waves of the pulse signal to output a counting signal by a counter circuit;
   generating a pulled-down depth signal according to the counting signal and the comparing signal by a depth control circuit; and
   generating the slope signal according to the pulled-down depth signal by a slope generator;
   wherein a waveform of the pulled-down depth signal is pulled down by a first depth each time the switch circuit is conducted, but when the number of times that the switch circuit is conducted reaches a conduction number threshold, the waveform of the pulled-down depth signal is pulled down by a second depth that is larger than the first depth.

8. The method of claim 7, wherein the first depth falls within a first depth threshold range, the second depth falls within a second depth threshold range, and depths within the first depth threshold range are larger than depths within the second depth threshold range.

9. The method of claim 7, further comprising the following step:
   using the depth control circuit to pull down the pulled-down depth signal by the second depth once, or pull down the pulled-down depth signal multiple times such that the pulled-down depth signal is pulled down by the second depth.

10. The method of claim 7, further comprising the following step:
    counting the number of times that a sub-switch circuit included in the switch circuit is conducted when the conduction detector circuit detects that the comparing signal is higher than the phase signal.

11. The method of claim 7, further comprising the following step:
    pulling down the waveform of the pulled-down depth signal by the second depth when the number of times that all sub-switch circuits included in the switch circuit are conducted reaches the conduction number threshold.

12. The method of claim 7, wherein the depth of the second depth is 1.5 times that of the first depth.

* * * * *